Figure 1:
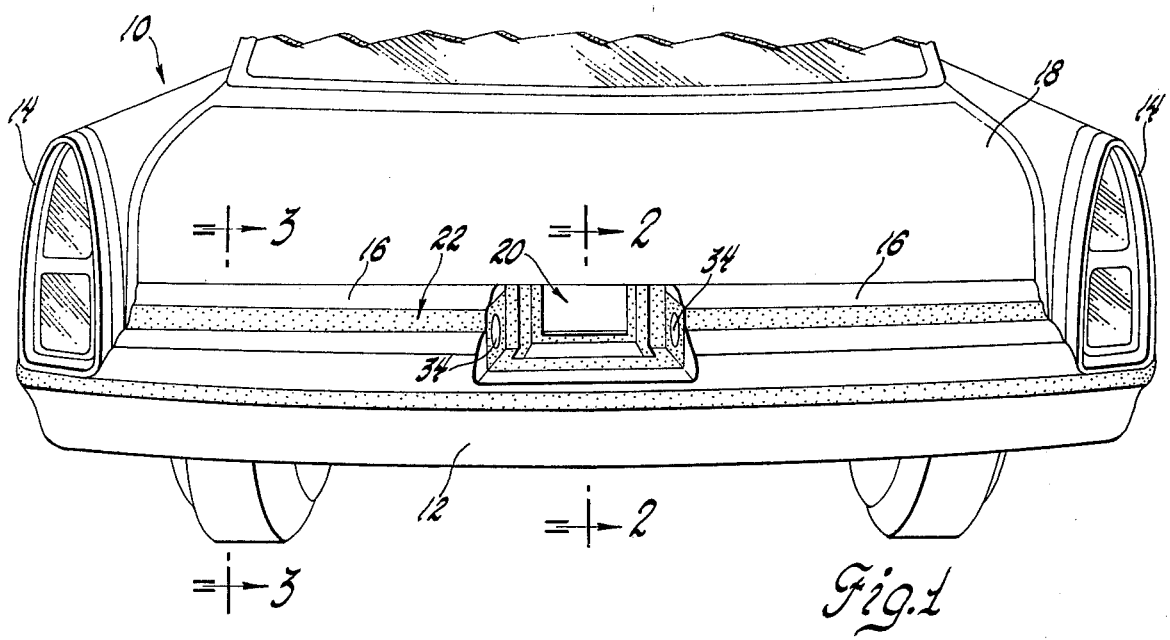

United States Patent [19]
Sanford et al.

[11] 3,933,385
[45] Jan. 20, 1976

[54] RESILIENT FILLER AND BUMPER SUPPORT ARRANGEMENT

[75] Inventors: Robert L. Sanford, Williamston; Casimer J. Wesolek, Lansing, both of Mich.

[73] Assignee: General Motors Corporation, Detroit, Mich.

[22] Filed: Mar. 17, 1975

[21] Appl. No.: 558,661

[52] U.S. Cl. ............... 293/63; 293/69 R; 293/89; 293/99; 296/1 C; 296/28 R
[51] Int. Cl.² ............... B60R 19/02; B60R 19/06; B61F 19/04; B62D 27/04
[58] Field of Search ........ 293/63, 69 R, 69 E, 69 V, 293/89, 99; 296/1 C, 28 R

[56] References Cited
UNITED STATES PATENTS

| | | | |
|---|---|---|---|
| 2,062,327 | 12/1936 | Morrison | 293/63 |
| 2,729,500 | 1/1956 | Dickenshied et al. | 296/1 C X |
| 2,739,010 | 3/1956 | Rowland | 296/1 C |
| 2,760,811 | 8/1956 | Basferd | 296/1 C |
| 2,893,779 | 7/1959 | Bayley | 293/69 R X |
| 3,493,257 | 2/1970 | Fitzgerald et al. | 293/63 X |
| 3,791,693 | 2/1974 | Hellriegel et al. | 293/63 X |

FOREIGN PATENTS OR APPLICATIONS

| | | | |
|---|---|---|---|
| 895,524 | 5/1962 | United Kingdom | 296/1 C |

*Primary Examiner*—M. Henson Wood, Jr.
*Assistant Examiner*—Howard Beltran
*Attorney, Agent, or Firm*—John P. Moran

[57] ABSTRACT

A combined resilient filler support arrangement for physically covering the space between an energy-absorber type automobile rear bumper and the adjacent fixed rear body portion, and for inherently providing a spring action capable of returning the components thereof to their original positions after being deflected in response to an external impact against the rear bumper.

3 Claims, 4 Drawing Figures

U.S. Patent   Jan. 20, 1976   Sheet 1 of 2   3,933,385

RESILIENT FILLER AND BUMPER SUPPORT ARRANGEMENT

This invention relates generally to automotive bumper-to-body filler means and, more specifically, to such filler means having provisions incorporated therein for "springing back" to an original free position after being deflected for any reason.

With the advent of automobile bumpers having energy-absorber means associated therewith for returning the bumpers to their original positions after any movement or deflection occasioned by external impact thereagainst, such bumpers having generally been spaced a predetermined distance apart from the adjacent automobile body, there has arisen a need to not only fill the space therebetween for the sake of appearance, but to assure that such filler will be able to deflect or buckle, etc., with movement of the bumper relative to the body and, thence, be able to return to its original position upon retraction by the energy-absorber type bumper.

Accordingly, an object of the invention is to provide improved bumper-to-body filler means which satisfies the above-described need.

Another object of the invention is to provide improved bumper-to-body filler means including an exposed filler member, and associated nonexposed filler support members which support the filler member in a predetermined position intermediate the bumper and the adjacent body and serve to cause the filler to "spring back" after being deflected or buckled for any reason, such as by external impact thereagainst or against the automobile bumper.

A further object of the invention is to provide improved bumper-to-body filler means including a filler member extending across the width of the automobile in the space between the bumper and the adjacent automobile body, and left- and right-hand support members therefor, each of such support members including an upper wall to which the filler member is secured, a lower wall which is secured to the bumper assembly, and one end wall interconnecting the upper and lower walls, with a plurality of spaced U-shaped brackets or ribs formed around the inner surfaces of the upper, end, and lower walls, serving to provide a spring-back action to the end and upper walls and, hence, to the filler member in the event of any deflection thereof resulting from an external source impact against the associated bumper.

Figure 2:
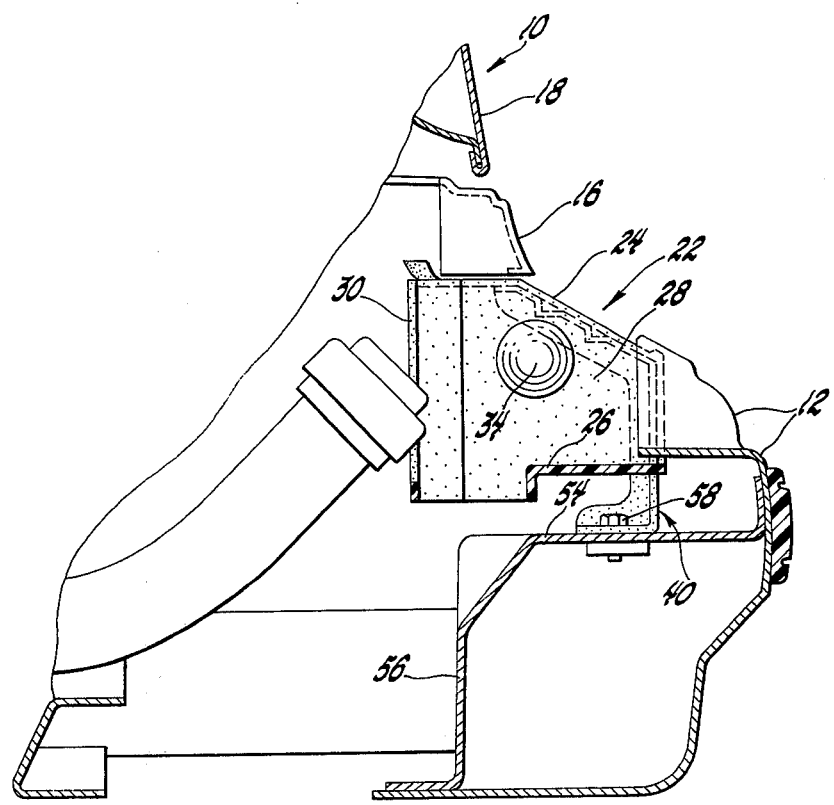
Figure 3:
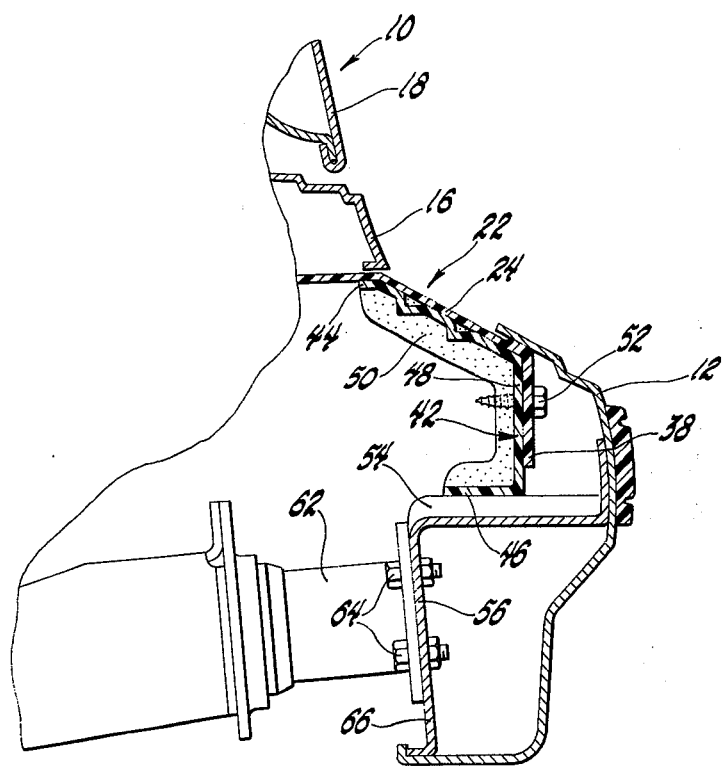
Figure 4:
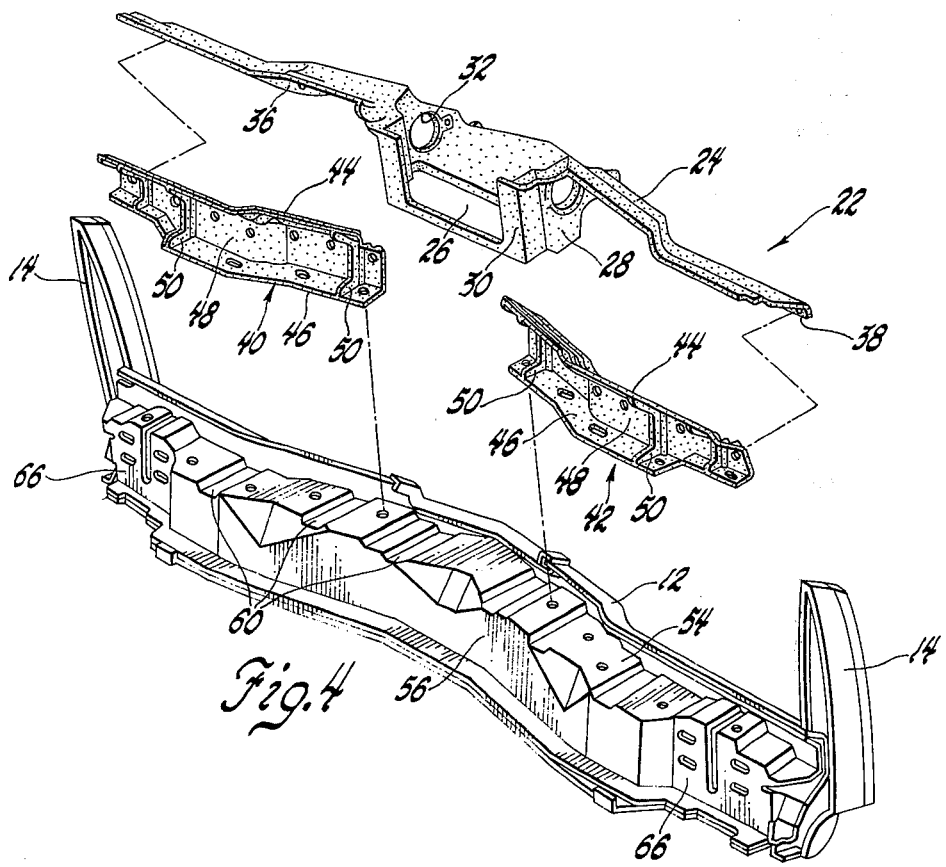

These and other objects and advantages of the invention will be apparent when reference is made to the following description and accompanying drawings, wherein:

FIG. 1 is a rear view of an automobile embodying the invention;

FIGS. 2 and 3 are fragmentary cross-sectional views taken along the planes of lines 2—2 and 3—3, respectively, of FIG. 1, and looking in the direction of the arrows; and FIG. 4 is an exploded perspective view of a portion of the FIG. 1 structure.

Referring now to the drawings in greater detail, FIG. 1 illustrates an automobile 10 having a rear bumper 12 mounted laterally thereacross, just below a pair of tail light housings 14 mounted substantially at the corners of the automobile body and an intermediate body portion 16. The latter body portion 16 may consist of a metal strip or a series of laterally aligned back-up light and/or turn signal lenses mounted adjacent the bottom edge of a trunk lid 18. A housing or compartment 20 for a license plate mounting bracket and/or a gasoline tank inlet cover may be formed so as to separate the body portion 16 into left- and right-hand sections.

A bumper-to-body flexible filler and filler support arrangement 22 is mounted longitudinally between the bumper 12 and the rear body sections 16, and laterally between the tail light housings 14.

As illustrated in FIGS. 2-4, the bumper-to-body flexible filler and filler support arrangement 22 includes a molded plastic filler member 24 mounted on substantially a horizontal or slightly upwardly sloping plane, as desired, in the space between the upper edge of the bumper and the bottom edges of the body portion 16. As may be noted in FIG. 4, the filler member 24 includes a central open portion which serves as the compartment 20, the central open portion being formed to include bottom and side walls 26 and 28, respectively, and a U-shaped flange 30 formed along the rear edges of the bottom and side walls 26 and 28. Apertures 32, formed in the side walls 28, serve as a means for mounting light sources 34 (FIGS. 1 and 2) for illuminating the usual license plate which may be mounted therebetween. Substantially vertical, downwardly extending flanges 36 and 38 are formed on the rear edge of the filler member 24, on respective opposite sides of the compartment 20 for a purpose to be explained.

The filler member 24 is supported by a pair of left- and right-hand filler support members 40 and 42, respectively, (FIG. 4), each having an upper wall 44, a lower or bottom wall 46, and an end wall 48 interconnecting the upper and bottom walls. A plurality of flexible U-shaped support brackets or ribs 50 are formed so as to be secured along the outer edges thereof against the respective inner surfaces of the upper, bottom and end walls 44, 46, and 48. The ribs 50 may be either separately formed, detachable parts or integrally molded components of the filler member 24.

The filler member 24 is secured to the end walls 48 of the filled support members 40 and 42 by suitable fasteners 52 (FIG. 3) mounted through the respective flanges 36 and 38, while the filler support members 40 and 42, in turn, are secured to the upper surface 54 of a reinforcement member 56 by suitable fasteners 58 (FIG. 2) mounted through the respective bottom walls 46. The reinforcement member 56 is secured by any suitable means, such as welding, to the inner surface of the bumper 12. As may be noted in FIG. 4, the upper surface 54 of the reinforcement member 56 includes a plurality of pockets or slots 60 formed across the width thereof, i.e., perpendicular to the bumper 12, in order to better reinforce the bumper 12. Suitable energy absorbers 62 (FIG. 3) are secured by fasteners 64 adjacent the respective vertical mounting surfaces 66 (FIG. 4) formed adjacent the ends of the reinforcement member 56, to return the latter and its associated bumper 12 to its original position after any impact-actuated movement thereof. It may be also noted in FIG. 4 that the bottom walls 46 of the filler support members 40 and 42 are shaped so as to conform to the general shape of the surface 54 of the member 52, spanning any adjacent pockets 60.

The filler member 24 and the filler support members 40 and 42 are each formed of a suitable plastic material. Upon impact, the plastic materials can deflect without damage thereto, with the ribs 50 providing a "spring" action for returning the filler member 24 to its original position with respect to the bumper 12 and the laterally aligned lenses 16.

It should be apparent that the invention provides external means for enhancing the appearance of the rear portion of an automobile, while including inherent means for restoring the inventive assembly to its original position after having been distorted by impact thereagainst.

It should also be apparent that the inventive filler and support arrangement may be used in conjunction with either a front or a rear bumper system.

While but one embodiment of the invention has been shown and described, other modifications thereof are possible.

We claim:

1. A filler and support arrangement for use in the space between an automotive bumper assembly and an adjacent body portion, said bumper assembly including an exposed bumper and an unexposed reinforcement member secured to the inner surface of said bumper, said filler and support arrangement comprising a laterally extending flexible plastic filler member, left- and right-hand flexible plastic support members, each having an upper wall, a lower wall, and an end wall interconnecting said upper and lower walls, said filler member being secured to said end walls, said left- and right-hand support members being secured at said respective lower walls thereof to portions of an upper surface of said reinforcement member, a plurality of substantially U-shaped ribs secured at the outer edges thereof to the respective inner surfaces of said upper, lower, and end walls of each of said left- and right-hand support members for providing a spring-back reaction of said filler member to its original position after being deflected in response to an external impact against said bumper.

2. A filler and support arrangement for use in the space between an automotive bumper assembly and an adjacent body portion, said bumper assembly including an exposed bumper and an unexposed reinforcement member secured to the inner surface of said bumper, said filler and support arrangement comprising a flexible plastic filler member including a central compartment portion with substantially horizontal lateral extensions formed on oppositely disposed sides thereof, and a substantially vertical downwardly extending flange formed along an edge of each of said lateral extensions, left- and right-hand flexible plastic support members, each having an upper wall, a lower wall, and an end wall interconnecting said upper and lower walls, said filler member being secured at said respective downwardly extending flanges thereof to said end walls, said left- and right-hand support members being secured at said respective lower walls thereof to oppositely disposed end-portions of an upper surface of said reinforcement member, a plurality of U-shaped ribs secured at the outer edges thereof to the respective inner surfaces of said upper, lower, and end walls of each of said left- and right-hand support members for providing a spring-back reaction of said filler member to its original substantially horizontal position after being deflected in response to an external impact against said bumper causing said bumper and, hence, said filler member to move relative to said adjacent body portion.

3. A filler and support arrangement for use in the space between an automotive bumper assembly and an adjacent body portion, said bumper assembly including an exposed bumper and an unexposed reinforcement member secured to the inner surface of said bumper, said filler and support arrangement comprising a flexible plastic filler member including a central compartment portion suitable for mounting a license plate therein, with substantially horizontal lateral extensions formed on oppositely disposed sides of said compartment portion, and a substantially vertical downwardly extending flange formed along an edge of each of said lateral extensions, left- and right-hand flexible plastic support members, each having an upper wall, a lower wall, and an end wall interconnecting said upper and lower walls, said filler member being secured at said respective downwardly extending flanges thereof to said end walls, said left- and right-hand support members being secured at said respective lower walls thereof to an upper surface of said reinforcement member, said lateral extensions of said filler member being formed to conform to said respective upper walls of said support member, said downwardly extending flanges of said filler member being formed to conform to said respective end walls of said support members, and said lower walls of said support members being formed to conform to oppositely disposed end-portions of said bumper reinforcement member, a plurality of U-shaped ribs secured at the outer edges thereof to the respective inner surfaces of said upper, lower, and end walls of each of said left- and right-hand support members for providing a spring-back reaction of said filler member to its original substantially horizontal position after being deflected in response to an external impact against said bumper causing said bumper and, hence, said filler member to move relative to said adjacent body portion.

\* \* \* \* \*